(12) United States Patent
Al-Harthi et al.

(10) Patent No.: US 8,242,219 B1
(45) Date of Patent: Aug. 14, 2012

(54) METHOD OF MAKING POLYOLEFIN NANOCOMPOSITES

(75) Inventors: Mamdouh Ahmad Al-Harthi, Dhahran (SA); Omer Bin Sohail, Dhahran (SA); Sadhan Kumar De, Dhahran (SA); Masihullah Jabarulla Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/401,611

(22) Filed: Feb. 21, 2012

(51) Int. Cl.
*C08F 4/44* (2006.01)
*B01J 31/38* (2006.01)

(52) U.S. Cl. .......... 526/89; 526/154; 526/160; 526/348; 526/352; 502/152; 502/73

(58) Field of Classification Search .................. 526/89, 526/154, 160, 348, 352; 502/73, 152
See application file for complete search history.

(56) References Cited

U.S. PATENT DOCUMENTS

| | | | |
|---|---|---|---|
| 5,252,529 A | 10/1993 | Ueda et al. | |
| 5,296,565 A | 3/1994 | Ueda et al. | |
| 5,840,808 A | 11/1998 | Sugimura et al. | |
| 6,063,871 A | 5/2000 | Kishine et al. | |
| 7,605,208 B2 | 10/2009 | Uosaki et al. | |
| 2007/0100056 A1 | 5/2007 | Uosaki et al. | |
| 2009/0127751 A1 | 5/2009 | Uosaki et al. | |

FOREIGN PATENT DOCUMENTS

| | | |
|---|---|---|
| CN | 101145017 A | 3/2008 |
| CN | 101864041 A | 10/2010 |

OTHER PUBLICATIONS

Scharlach et al., New Polyolefin-Nanocomposites by in Situ Polymerization with Metallocene Catalysts, Macromol. Symp. 2008, vol. 261, pp. 10-17.*
Yu et al., Influence of nano-AlN particles on thermal conductivity thermal stability and cure behavior of cycloaliphatic epoxy/trimethacrylate system, Express Polymer Letters, vol. 5, No. 2 (2011) pp. 132-141.*
Yu at al., "Influence of nano-AlN particles on thermal conductivity, thermal stability and cure behavior of cycloaliphatic epoxy/trimethacrylate system", *Express Polymer Letters*, vol. 5, No. 2 (2011) 132-141.
Jeon et al., "Nanocomposites Derived from Polymers and Inorganic Nanoparticles", *Materials* 2010, 3(6), 3654-3674.
Katrin Scharlach at al., "New Polyolefin Nanocomposites by in Situ Polymerization with Metallocene Catalysts," Macromol. Symp., vol. 261 (2008), pp. 10-17.

* cited by examiner

*Primary Examiner* — Robert D. Harlan
(74) *Attorney, Agent, or Firm* — Richard C. Litman

(57) ABSTRACT

The method for producing polyolefin nanocomposites uses an aluminum nitride (AlN) nano-filler as a promoter of olefin polymerization with a metallocene catalyst. The method of making the polyolefin nanocomposites begins by combining a metallocene catalyst, such as a zirconocene catalyst, with aluminum nitride in a reactor. The reactor is then charged with toluene and methylaluminoxane, methylaluminoxane acting as a co-catalyst. The reactor is then heated at a constant temperature, and ethylene is added to the reactor to initiate polymerization of a polyethylene nanocomposite. Polymerization is then quenched by the addition of acidic methanol to the reactor, and un-reacted monomer is vented from the reactor. The resultant polyethylene nanocomposite is then washed in methanol and dried. The aluminum nitride nano-filler promotes the conversion of the olefin monomer to the polyolefin.

18 Claims, No Drawings

METHOD OF MAKING POLYOLEFIN NANOCOMPOSITES

BACKGROUND OF THE INVENTION

1. Field of the Invention

The present invention relates to the production of polyolefin nanocomposites, and particularly to the use of an aluminum nitride (AlN) nano-filler as a promoter of olefin polymerization with a metallocene catalyst.

2. Description of the Related Art

Polyethylene (or polythene) is the most widely used plastic, with an annual production of about 80 million metric tons. Without the usage of conversion catalysts, polyethylene manufacture is relatively difficult. A chromium trioxide-based catalyst, referred to as the Phillips catalyst, was first discovered in the early 1950's, and a catalytic system based on titanium halides and organo-aluminum compounds that worked at even milder conditions than the Phillips catalyst was developed later in the decade. These catalysts are referred to as Ziegler-type catalysts. The Phillips catalyst, however, is less expensive and easier to work with, and both methods are still used in industrial practice.

A third type of catalytic system, one based on metallocenes, was discovered in the 1970's. The Ziegler and metallocene catalyst families have since proven to be very flexible at copolymerizing ethylene with other olefins and have become the basis for the wide range of polyethylene resins available today, including very low density polyethylene and linear low-density polyethylene. Such resins have begun to replace aramids in many high-strength applications.

Given the advantages provided by metallocene catalysts, it would be desirable to develop a metallocene catalyst-based method for polymerizing ethylene with an optimal conversion activity. Metallocene catalysts provide certain flexibility with respect to activity, particularly in comparison to Ziegler-Natta catalysts. This is possible due to the addition of fillers, which act as promoters to the catalyst. Although various fillers have been experimented with in recent years, several problems still exist in their use. Difficulties in controlling polymer morphology with soluble catalysts have been encountered, along with the necessity of using relatively large amounts of co-polymers to achieve maximum catalytic activity. It would obviously be desirable to find a filler that easily controls polymer morphology, but does not require large quantities of co-polymers to be used, and which further enhances the overall properties of the resultant polyethylene composites.

Thus, a method of making polyolefin nanocomposites solving the aforementioned problems is desired.

SUMMARY OF THE INVENTION

The present invention relates to the production of polyolefin nanocomposites, and particularly to the use of an aluminum nitride (AlN) nano-filler, preferably in the form of AlN nanoparticles, as a promoter of olefin polymerization by in situ polymerization with a metallocene catalyst. The method of making the polyolefin nanocomposites begins by combining a metallocene catalyst, such as a zirconocene catalyst, with aluminum nitride in a reactor. The reactor is then charged with toluene and methylaluminoxane (MAO), the methylaluminoxane acting as a co-catalyst. The reactor is then heated at a constant temperature, and ethylene is added to the reactor to initiate polymerization of a polyethylene nanocomposite. Polymerization is then quenched by the addition of acidic methanol to the reactor, and un-reacted monomer is vented from the reactor. The resultant polyethylene nanocomposite is then washed in methanol and dried. The aluminum nitride nano-filler promotes the conversion of the olefin monomer to the polyolefin.

These and other features of the present invention will become readily apparent upon further review of the following specification.

DETAILED DESCRIPTION OF THE PREFERRED EMBODIMENTS

The present invention relates to the production of polyolefin nanocomposites, and particularly to the use of an aluminum nitride (AlN) nano-filler as a promoter of olefin polymerization by in situ polymerization with a metallocene catalyst. The method of making the polyolefin nanocomposites begins by combining a metallocene catalyst, such as a zirconocene catalyst ($Cp_2ZrCl_2$), with aluminum nitride (AlN) nanoparticles (less than 100 nm, obtained from Sigma Aldrich) in a reactor. The reactor may be a conventional 250 ml round-bottom flask with a magnetic stirrer and thermometer, or the like. For about 15 mg of AlN nano-filler, about 6 mg of zirconocene dichloride is added to the reactor. As will be shown below, about 15 mg of the AlN nano-filler is found to provide optimal conversion activity.

The reactor is then charged with about 80 mg of toluene and about 5 ml of methylaluminoxane (MAO), the methylaluminoxane acting as a co-catalyst. The reaction is carried out under about one bar of an $N_2$ atmosphere. The reactor is then heated at a constant temperature, and ethylene is added to the reactor, after removing nitrogen gas under vacuum, to initiate polymerization of a polyethylene nanocomposite. The heating may be accomplished by immersing the reactor in a constant temperature bath, which is set to a desired temperature prior to immersion. As will be shown below, a temperature of about 30° C. is found to provide optimal conversion activity.

Once the temperature of the bath and the temperature of the reactor have been determined to be equivalent, the ethylene was introduced into the reactor after nitrogen gas was removed from the reactor under vacuum. Preferably, the ethylene is added relatively slowly to the reactor, for example, spread over about one hour under a pressure of about one bar.

Polymerization of the ethylene to form the polyethylene nanocomposite takes about thirty minutes, and the polymerization may then be selectively quenched by the addition of acidic methanol to the reactor. About 170 ml of 5% acidic methanol is added to the reactor. Un-reacted monomer may then be vented from the reactor. The resultant polyethylene nanocomposite is then washed in additional acidic methanol and dried. The drying may take place in a vacuum oven or the like at a temperature of about 50° C.

The aluminum, nitride nano-filler promotes the conversion of the olefin monomer to the polyolefin at a conversion rate of up to twice that of conventional production methods. The AlN promoter is also found to have an impact on the catalytic activity, even in the presence of different substitute groups in the catalyst. As will be shown below, the AlN filler is also found to increase the conversion activity over a broad temperature range.

The polyethylene nanocomposites were synthesized by in-situ polymerization using the AlN nano-filler. The characterization of the polyethylene nanocomposites, described below, was carried out using differential scanning calorimetry (DSC) to examine the effect of the nano-filler on thermal behavior of the composite. The activity of the samples and thermal behavior will be discussed below with respect to filler content, temperature and time.

As shown in Table 1 below, differing quantities of fillers were studied, particularly 15 mg, 30 mg and 45 mg of the AlN filler. It was found that polymerization activity was at its highest value of $329.62 \times 10^{-5}$ gPE/mol Zr h bar at 15 mg of the AlN nano-filler. The additional quantities of the nano-filler (i.e., 30 mg and 45 mg) did not significantly increase the activity, compared to a control having no filler. A significant increase in conversion activity was found, compared to the control, with the use of 15 mg of the AlN nano-filler.

In order to test the influence of temperature on activity, reaction temperatures of both 30° C. and 60° C. were used. However, the 60° C. trials, as shown below in Table 1, yielded decreases in the activity of the catalyst, although it should be noted that the activity with the AlN filler at 60° C. was still greater than that of the control having no filler.

TABLE 1

Activity and Thermal Properties

| Entry No. | Filler (mg)[a] | Temp (° C.) | Activity[d] | Time (min) | Tm (° C.) |
|---|---|---|---|---|---|
| 1 | 0[c] | 30 | 149.46 | 30 | 133.07 |
| 2 | 15 | 30 | 329.62 | 30 | 129.62 |
| 3 | 30 | 30 | 189.41 | 30 | 129.71 |
| 4 | 45 | 30 | 107.01 | 30 | 131.52 |
| 5 | 0[c] | 60 | 181.15 | 30 | 131.26 |
| 6 | 15 | 60 | 235.54 | 30 | 130.65 |
| 7 | 0[b,c] | 30 | 132.80 | 30 | 132.50 |
| 8 | 15[b] | 30 | 267.67 | 30 | 129.45 |

[a]AlN;
[b]with less amount of MAO;
[c]Control;
[d]×10$^{-5}$ gPE/mol Zr h bar

It should be noted that experiments with lower quantities of MAO were also performed, and the same improvement in activity due to the AlN nano-filler was found, even with lower quantities of the MAO co-catalyst. As noted above, differential scanning calorimetry was used to determine the thermal characteristics of the resultant polyethylene nanocomposites. As shown above in Table 1, the control was found to have a melting temperature (TM) of 133.07° C., which is slightly higher than the optimal value of 129.6° C. for the samples prepared with 15 mg of the AlN nano-filler. Thus, activity is found to increase with a marginal lowering of thermal characteristics, which is acceptable at the cost of the added activity advantage.

It is to be understood that the present invention is not limited to the embodiments described above, but encompasses any and all embodiments within the scope of the following claims.

We claim:

1. A method of making a polyolefin nanocomposite, comprising the steps of:
   combining a metallocene catalyst and nanoparticles of aluminum nitride in a reactor;
   charging the reactor with toluene and methylaluminoxane (MAO);
   heating the reactor at a constant temperature; and
   adding ethylene to the reactor to initiate polymerization of a polyethylene nanocomposite.

2. The method of making a polyolefin nanocomposite as recited in claim 1, wherein said metallocene catalyst comprises zirconocene dichloride.

3. The method of making a polyolefin nanocomposite as recited in claim 2, wherein said nanoparticles of aluminum nitride have a particle size less than 100 nanometers.

4. The method of making a polyolefin nanocomposite as recited in claim 3, wherein said step of heating the reactor at a constant temperature comprises immersing the reactor in a constant temperature bath.

5. The method of making a polyolefin nanocomposite as recited in claim 4, wherein said step of heating the reactor at a constant temperature comprises immersing the reactor in a constant temperature bath having a temperature of about 30° C.

6. The method of making a polyolefin nanocomposite as recited in claim 5, wherein polymerization of the ethylene in the reactor is performed for about thirty minutes.

7. The method of making a polyolefin nanocomposite as recited in claim 1, further comprising the step of removing nitrogen gas from the reactor under vacuum prior to the step of adding the ethylene to the reactor.

8. The method of making a polyolefin nanocomposite as recited in claim 1, further comprising the step of adding acidic methanol to the reactor to selectively quench polymerization.

9. The method of making a polyolefin nanocomposite as recited in claim 8, further comprising the step of venting non-reacted monomer ethylene from the reactor.

10. The method of making a polyolefin nanocomposite as recited in claim 1, further comprising the step of washing the polyethylene nanocomposite with methanol.

11. The method of making a polyolefin nanocomposite as recited in claim 10, further comprising the step of drying the washed polyethylene nanocomposite.

12. The method of making a polyolefin nanocomposite as recited in claim 11, wherein the step of drying the washed polyethylene nanocomposite comprises drying the washed polyethylene nanocomposite in a vacuum oven at a temperature of about 50° C.

13. A method of making a polyolefin nanocomposite, comprising the steps of:
   combining a zirconocene dichloride catalyst and nanoparticles of aluminum nitride in a reactor;
   charging the reactor with toluene and methylaluminoxane (MAO);
   heating the reactor at a constant temperature;
   adding ethylene to the reactor to initiate polymerization of a polyethylene nanocomposite;
   adding acidic methanol to the reactor to selectively quench polymerization of the ethylene;
   venting non-reacted monomer ethylene from the reactor;
   washing the polyethylene nanocomposite with methanol; and
   drying the washed polyethylene nanocomposite.

14. The method of making a polyolefin nanocomposite as recited in claim 13, wherein said nanoparticles of aluminum nitride have a particle size of less than 100 nanometers.

15. The method of making a polyolefin nanocomposite as recited in claim 13, wherein said step of heating the reactor at the constant temperature comprises immersing the reactor in a constant temperature bath having a temperature of about 30° C.

16. The method of making a polyolefin nanocomposite as recited in claim 13, wherein the step of adding the ethylene to the reactor comprises adding the ethylene to the reactor for a period of about one hour at a pressure of about one bar.

17. The method of making a polyolefin nanocomposite as recited in claim 13, further comprising the step of removing nitrogen gas from the reactor under vacuum prior to the step of adding the ethylene to the reactor.

18. The method of making a polyolefin nanocomposite as recited in claim 13, wherein the step of drying the washed polyethylene nanocomposite comprises drying the washed polyethylene nanocomposite in a vacuum oven at a temperature of about 50° C.

* * * * *